Feb. 6, 1951
J. J. RUIZ
2,540,598
FURNACE EQUIPMENT
Filed June 3, 1946
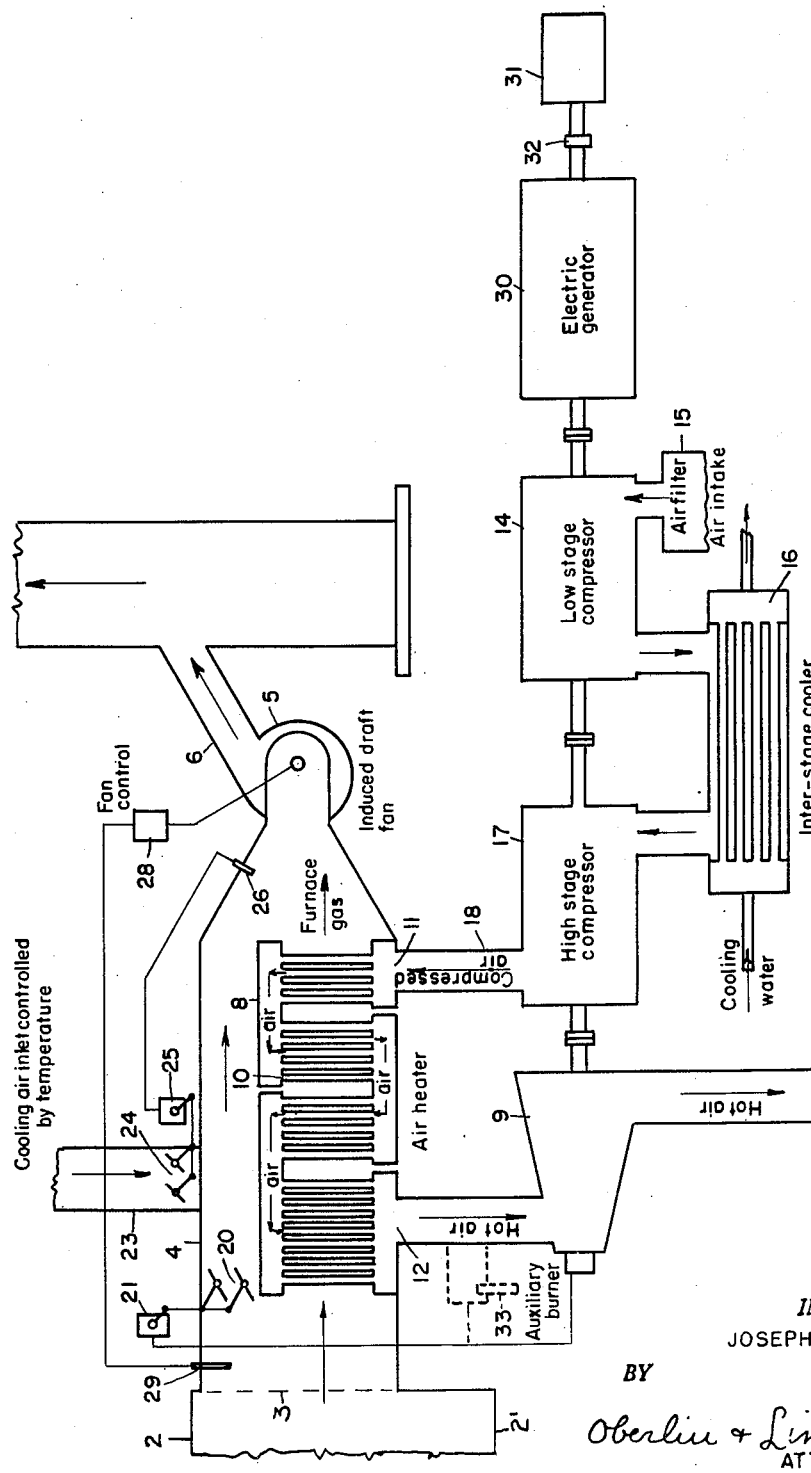
INVENTOR.
JOSEPH J. RUIZ
BY
Oberlin & Limbach
ATTORNEYS Patented Feb. 6, 1951

2,540,598

UNITED STATES PATENT OFFICE 2,540,598

FURNACE EQUIPMENT

Joseph J. Ruiz, Cleveland, Ohio, assignor to Basic Refractories, Inc., Cleveland, Ohio, a corporation of Ohio Application June 3, 1946, Serial No. 673,930

9 Claims. (Cl. 263—19)

In high temperature furnaces for metals and minerals, including rotary "kilns" as for calcining dolomite and other carbonates, cement materials, etc., the exit gas discharges at such very high temperature that it is ordinarily not even satisfactorily amenable to exhauster fans and like means for controlling the furnace; and much less is it amenable to desirably efficient means for a suitable control making possible the application of carbon dioxide or other component of the gas in chemical or other uses in connection with the plant. In accordance with the present invention, however, such a furnace may be controlled with accuracy as to its draft and temperature, and the gas as participating in such control function may be further applied to associated usage. Other objects and advantages will be apparent from the following description.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

In said annexed drawing the sole figure is a semi-diagrammatic showing of furnace apparatus in accordance with the invention.

As indicated in the drawing, the high temperature furnace 2 has its gas discharge outlet 3 connecting to a housing 4 which leads to an exhauster fan 5 and thence to a flue 6 and a point of usage or a stack. Quite commonly, a settling chamber 2' or the like is provided at the end of the furnace. In the housing 4 is positioned an air conduit system 8 which conducts air from a compressor through the zone of high temperature furnace gas and to a motor such as a turbine 9. The air conduit system 8 is of indirect contact type, having a series of branch conduits 10 which extend between manifolds or headers, and which forward the air progressively from its inlet 11 to its outlet 12, thereby being exposed to the very high temperature furnace gas, and taking up heat therefrom. The compressor equipment may be a single stage, or preferably multiple stage, as for instance a low pressure intake compressor 14 taking air through a filter 15 and discharging through an interstage cooler 16 which provides water in indirect heat exchange for maintenance of efficiency, and thence the air may proceed to a high pressure compressor 17 and to the duct 18 and on to the conduit system. An air filter is not necessary in all cases, but is found to be generally desirable, in lessening wear and abrasion on the subsequent mechanisms encountered, inasmuch as air supply commonly available around furnaces is seriously contaminated with abrasive dust. The exhauster 5 has its speed controlled by a motor control or the like 28, 29, which is responsive to the draft or pressure variation in the furnace and thereby the draft is regulated to the predetermined level. The detail construction of such controller being immaterial, any of the commercial devices for this purpose may be applied. A by-pass around the conduit system 8 is provided, and this is controlled by a by-pass damper 20 which is operated by a controller 21 including the turbine governor, and thereby the heat uptake, and the power generated by the turbine is controlled and regulated.

A cooling-air inlet 23 is provided with a control damper 24 which is operated by a controller 25 actuated by a pyrometer or a temperature control means 26 in the passage leading to the exhauster 5. By this means, the exhauster 5 may be protected against damage from excess flows of by-pass gas.

A high degree of precision throughout is attained by reason of the multiple cooperating control means, and the air which is thus used in the temperature control of the furnace gas is applied not only to regulate such temperature, but also carries the energy to operate the compressor system. The air discharged from the turbine is in clean heated condititon available for combustion feed or plant uses.

As an illustration: A rotary kiln operating on the calcination of dolomite and being of dimensions 10 feet in diameter and 375 feet long, produces approximately 156,000 pounds of flue gas per hour containing around 29% of carbon dioxide, and having a temperature of between 1200 and 1500° F. If the temperature of such exit gas be reduced to around 375° F., it requires the removal of around 50,000,000 B. t. u. per hour. If such gas be merely discharged to a dissipating stack, very high stacks of large diameter and involving a large investment are required; and on the other hand, the very high temperature of the discharge gas is too destructive on exhauster fan equipment. But, with installation as aforedescribed, the furnace gas may be conditioned during its control, such as to be capable of further application in chemical or other uses. Thus, with an output as above-noted on the order of 50,000,000 B. t. u. per hour, the gas may contain 54,000 lbs. of carbon dioxide per hour, 90,000 lbs. of nitrogen, 10,000 lbs. of water vapor, and 1,800 lbs. of oxygen, or a total of 155,800 lbs. per hour, with a temperature around 1500° F. at the point where encountering the air conduit system, and dropping to around 375° F. where leaving; and air at the rate of 48,000 cu. ft. per minute at standard conditions (e. g. atmospheric temperature 60° F. and 14.7 lbs. per square inch absolute) is compressed in the low pressure compressor to 44 lbs. and temperature around 286° F. This air passing through the inter-stage cooler then enters the high pressure compressor at a temperature of around 100° F., and is discharged at 88 lbs. per square inch absolute and a temperature around 245° F. The compressed air then circulated through the air conduit system enters the turbine at about 1100° F. and 87 lbs. pressure, and in the turbine expands, and exhausts at approximately 15 lbs. pressure absolute and temperature about 570° F. The air is then supplied as combustion air to the furnace, or may be otherwise applied in plant usage. With turbine operation under the conditions stated, there is a surplus of power capable of also driving an electric generator 30, with an output of 2700 k.w. This arrangement has the further advantage of great flexibility in that the combination of turbine and compressors can be adapted to suit different conditions. If a greater volume of hot air is required or if the air is to be exhausted at a higher temperature, the electric power generator may be correspondingly smaller, or on the other hand, if there is less requirement for heated air, the generator can be larger. A motor starter 31 which may be connected to the shaft by a suitable clutch 32, is provided for starting the compressors and the operating cycle.

In further adaptability, when the furnace is operating low or is down, or where additional or temporary higher output of power or hot air is required, an auxiliary burner 33 supplied by oil or other fuel and feeding hot combustion gas to the connection between the air conduit system and the turbine 9 may be used.

The carbon dioxide leaving the exhauster at a temperature, for instance, of 375° F., after further cooling and scrubbing, is then applicable in carbonating magnesium hydroxide or mixtures of magnesium hydroxide and calcium hydroxide as obtained from calcination of dolomite and further involved in separation of magnesium and calcium values from dolomite. In some furnace gas, undesirable sulphur present may be removed by soda ash solution or other known treatment.

Thus, in furnaces generally, where exit gas temperatures are above 700° F., this manner of controlling the furnace and conditioning the exit gases with mechanical draft equipment is available, such as in open hearth furnaces, metal smelting and refining furnaces, malleable iron furnaces, glass furnaces, and in the calcining of dolomite, limestone, magnesite, calcium carbonate, manganese ores, phosphates, sodium bicarbonate, soda ash, cement, etc.

Other modes of applying the principle of the invention may be employed, change being made as regards the detail described, provided the features stated in any of the following claims, or the equivalent of such, be employed.

I therefore particularly point out and distinctly claim as my invention:

1. A rotary kiln having in its exhaust gas outlet temperature-sensitive means, an air inlet from the atmosphere controlled by said means and opening into the exhaust gas stream, exhauster means discharging the gas, a pressure-sensitive means responsive to the kiln pressure controlling said exhauster, a closed air-conduit system exposed in said gas outlet, a filter and a low pressure compressor and a high pressure air compressor feeding from the atmosphere therethrough, motor means operated by the air from the conduit system to drive said compressors, an auxiliary combustion heater connected to the air conduit system between the furnace outlet and said motor means, an air discharge from said motor means, a gas by-pass from the furnace around the air conduit system to said exhauster, and damper means for said by-pass controlled by said motor means.

2. A rotary kiln having in its exhaust gas outlet temperature-sensitive means, an air inlet from the atmosphere controlled by said means and opening into the exhaust gas stream, exhaust means discharging the gas, a pressure-sensitive means responsive to the kiln pressure controlling said exhauster, an air conduit system exposed in said gas outlet, an air compressor feeding from the atmosphere therethrough, motor means operated by the air from the conduit system to drive said compressors, an auxiliary combustion heater connected to the air conduit system between the furnace outlet and said motor means, an air discharge from said motor means, a gas by-pass from the furnace around the air conduit system to said exhauster, and damper means for said by-pass controlled by said motor means.

3. A rotary kiln having in its exhaust gas outlet temperature-sensitive means, an air inlet from the atmosphere controlled by said means and opening into the exhaust gas stream, exhauster means discharging the gas, a pressure-sensitive means responsive to the kiln pressure controlling said exhauster, an air-conduit system exposed in said gas outlet, an air compressor feeding therethrough, motor means operated by the air from the conduit system to drive said compressor, an air discharge from said motor means, a gas by-pass from the furnace around the air conduit system to said exhauster, and damper means for said by-pass controlled by said motor means.

4. A furnace having temperature-sensitive means in its exhaust gas outlet, an air inlet from the atmosphere controlled by said means and opening into the exhaust gas stream, exhauster means discharging the gas, a pressure-sensitive means responsive to the furnace pressure controlling said exhauster, an air-conduit system exposed in said gas outlet, an air compressor feeding therethrough, motor means operated by the air from the conduit system to drive said compressor, an air discharge from said motor means, and means for controlling the amount of exhaust gas passing over the air conduit system.

5. A furnace having exhauster means discharging exit gas, variable drive means for said exhauster means, means responsive to furnace pressure variation for controlling said variable drive, an air conduit system exposed in the gas outlet, an air compressor feeding through said air conduit system, motor means operated by the air from the conduit system to drive said compressor, a gas by-pass from the furnace around the air conduit system to said exhauster, damper means for said by-pass, and a connection from said motor means for controlling the damper means.

6. A furnace having exhauster means discharging exit gas, an air-conduit system exposed in the gas outlet, air compressor means feeding said air conduit system, motor means operated by the air from the conduit system, a gas by-pass from the furnace around the air conduit system to said exhauster, and a connection from said motor means for controlling said by-pass.

7. A furnace having temperature-sensitive means in its gas outlet, a cooling air inlet from the atmosphere controlled by said means and opening into the exhaust gas stream, exhauster means discharging the gas, pressure-sensitive means responsive to the furnace pressure controlling said exhauster, an air conduit system exposed in the gas outlet, an air compressor means feeding from the atmosphere therethrough, and motor means operated by the air from the conduit system.

8. A furnace having an air conduit system exposed in its gas outlet, air compressor means feeding therethrough, motor means operated by the air from the conduit system, a damper-equipped by-pass around said air conduit system, governor means operated by the motor means, and a connection from said governor means for controlling the by-pass damper.

9. A furnace having in its gas outlet an air-conduit system, an air compressor feeding thereto, motor means operated by the air from the conduit system, means including a diversion damper in said gas outlet for regulating the gas outlet flow on said air conduit system, and a connection from said motor means to control said damper.

JOSEPH J. RUIZ.

REFERENCES CITED

The following references are of record in the file of this patent:

UNITED STATES PATENTS

| Number | Name | Date |
| --- | --- | --- |
| 1,401,222 | Wiberg | Dec. 21, 1921 |
| 1,836,581 | De Baufre et al. | Dec. 15, 1931 |
| 1,927,215 | Peebles | Sept. 19, 1933 |
| 2,401,285 | Woodward | May 28, 1946 |

FOREIGN PATENTS

| Number | Country | Date |
| --- | --- | --- |
| 410,078 | Germany | Apr. 1, 1924 |